(12) United States Patent
Poling et al.

(10) Patent No.: US 6,915,826 B2
(45) Date of Patent: Jul. 12, 2005

(54) PUNCTURE SEALING PNEUMATIC TIRE

(75) Inventors: David Charles Poling, Uniontown, OH (US); Susan Lynn Deevers, Clinton, OH (US); Samuel Patrick Landers, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 236 days.

(21) Appl. No.: 10/315,406

(22) Filed: Dec. 6, 2002

(65) Prior Publication Data

US 2004/0108036 A1 Jun. 10, 2004

(51) Int. Cl.⁷ .............................................. B60C 19/12
(52) U.S. Cl. ...................... 152/505; 152/502; 152/503; 156/115
(58) Field of Search ................................ 152/502–507, 152/510, DIG. 16; 156/115

(56) References Cited

U.S. PATENT DOCUMENTS

| | | |
|---|---|---|
| 1,239,291 A | 9/1917 | Monc |
| 1,959,460 A * | 5/1934 | Crossan ........................ 156/115 |
| 2,537,107 A * | 1/1951 | Waber ........................... 156/115 |
| 2,877,819 A | 3/1959 | Gibbs ........................... 152/347 |
| 3,444,918 A | 5/1969 | Goggins ....................... 152/347 |
| 3,563,294 A | 2/1971 | Chien ........................... 152/346 |
| 4,206,796 A | 6/1980 | Chemizard ................... 152/347 |
| 4,286,643 A | 9/1981 | Chemizard et al. .......... 152/347 |
| 4,359,078 A | 11/1982 | Egan ............................ 152/504 |
| 4,388,261 A | 6/1983 | Codispoti et al. ............ 264/171 |
| 4,895,610 A | 1/1990 | Egan ............................ 156/115 |
| 4,919,183 A | 4/1990 | Dobson ........................ 152/502 |
| 4,966,213 A | 10/1990 | Kawaguchi et al. ......... 152/504 |
| 4,978,563 A | 12/1990 | Sandels ......................... 428/63 |
| 6,112,790 A * | 9/2000 | Hsiao ........................... 152/503 |
| 6,786,990 B1 * | 9/2004 | Yamagiwa ................... 156/115 |
| 2003/0155058 A1 | 8/2003 | Saito ............................ 152/505 |

FOREIGN PATENT DOCUMENTS

DE    19839911    3/2000    .......... B29C/73/22

* cited by examiner

Primary Examiner—Geoffrey L. Knable
(74) Attorney, Agent, or Firm—Nancy T. Krawczyk

(57) ABSTRACT

A pneumatic tire has a puncture sealing layer radially inward of the tire carcass layer. The puncture sealing layer is formed by co-extruding a sealant material and an skin compound.

13 Claims, 3 Drawing Sheets

PUNCTURE SEALING PNEUMATIC TIRE

FIELD OF THE INVENTION

The present invention is directed to a pneumatic tire having a puncture sealing layer. More specifically, the present invention is directed to a pneumatic tire incorporating a layer formed by co-extruding a sealant material and an elastomeric material.

BACKGROUND OF THE INVENTION

Pneumatic tires with puncture sealing properties is known in the art. Such tires have included providing the tire with a strip of unvulcanized rubber that has puncture sealing properties or employing an encased or encapsulated sealant material between calendered layers which is located either in the tire or on the radially inner side of the tire.

Whichever method is used, if the sealant layer is not applied to the inner side of the tire following vulcanization, the sealant layer must be build into the tire like a conventional tire component on a tire building drum. In order for the sealant material to be handled as a conventional tire component, it must have sufficient stiffness. However, an increased stiffness in the sealant material results is increased viscosity of the material to the point where the material does not seal punctures effectively.

The present invention is directed to a method of building a tire and a puncture sealing tire having a low viscosity sealant material incorporated therein.

SUMMARY OF THE INVENTION

It is an aspect of this invention to provide a pneumatic tire that has an ability to seal against various puncturing objects.

Discloses is a pneumatic tire comprising a carcass layer, an innerliner located radially inward of the carcass layer, and a sealant layer located radially outward of the innerliner. The sealant layer is comprised of a plurality of individually co-extruded sealant tubes wherein the sealant tubes have an outer skin and an interior of sealant material.

In one aspect of the invention, the sealant tubes can have a variety of cross-sectional configurations, including circular, rectangular, or triangular. The cross-sectional can be of any desired configuration that enables the tubes to easily stack and form adjacent layers.

In another aspect, the sealant layer is formed from multiple radially adjacent layers of sealant tubes. Disclosed is the formation of at least two to five layers of sealant tubes.

In another aspect of the invention, to assist in curing of the sealant layer in the tire, the outer skin is elastomer and has the same composition as the innerliner of the tire. Alternatively, the outer skin is elastomer and can have the same composition as an elastomer comprising the carcass layer.

Also disclosed are alternative locations for the sealant layer: radially below the innerliner, between the innerliner and the adjacent carcass plies, or between a pair of carcass plies.

Also disclosed are methods of forming the tubes and the layers of tubes. In one aspect, the sealant tubes are helically wound to form the sealant layer on either the tire building drum or a separate drum. Alternatively, the sealant tubes may be formed by co-extruded tubes adjacent to one another to form a sheet of tubes.

BRIEF DESCRIPTION OF THE DRAWINGS

The invention will be described by way of example and with reference to the accompanying drawings in which.

DETAILED DESCRIPTION OF THE INVENTION

Figure 1:
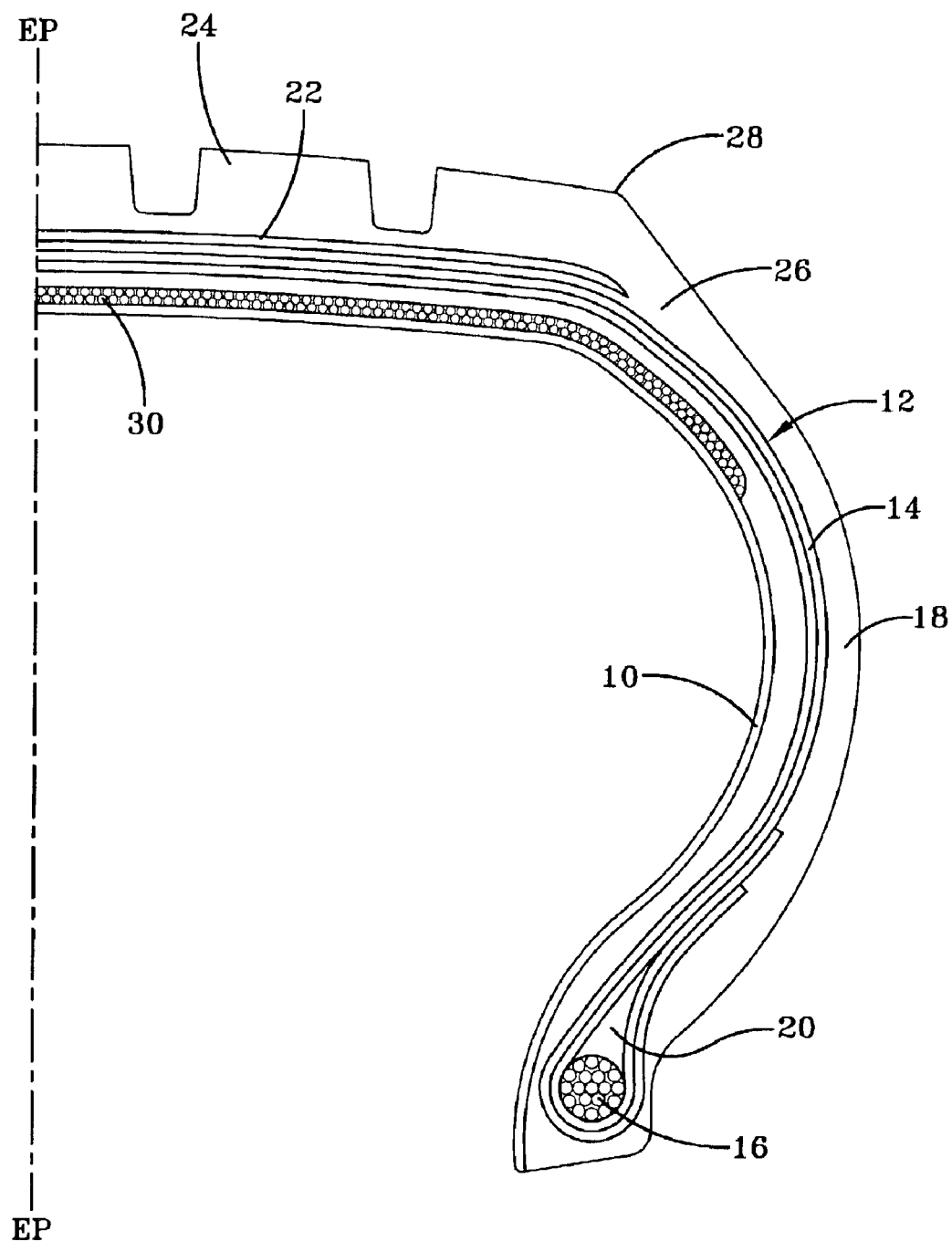
FIG. 1 is a cross-sectional view of a tire having a sealant layer.

Illustrated in FIG. 1 is cross-section of a pneumatic tire divided along its equatorial plane E; the non-illustrated half of the tire is ideally a mirror image of the illustrated half. The tire has the following construction: an innerliner 10, a carcass layer 12 formed from a number of plies 14, the carcass plies 14 being turned up about a pair of bead cores 16 located at the radially inner end of each sidewall 18, an apex 20 extending radially above each bead core 16 to fill in the space between the main portion of the carcass plies 14 and the turn-up portions of the carcass plies 14, a belt structure 22 radially outward of the carcass layer 12, and a tread 24 radially outward of the belt structure, the tire having a pair of shoulders 26 that extend from the tread edges 28 to the sidewalls 18. The illustrated tire is merely exemplary and one skilled in the art would readily appreciate that the above described elements of the tire will vary depending on the end use of the tire. For example, if the tire were to be used as a radial medium truck tire, the number of carcass plies would be at least three and at least two steel belt plies.

Located radially outward of the innerliner 10 is a sealant layer 30. The sealant layer 30 extends at least from an axial location corresponding to the tread edges 28. The sealant layer 30 preferably extends into the upper regions of the sidewalls 18 and for some tires subject to sidewall punctures during use, the sealant layer 30 may extend from bead core 16 to bead core 16. The sealant layer 30 is illustrated as being adjacent to the innerliner 10 and radially inward of the carcass layer 12. However, the sealant layer 30 may also be placed between adjacent carcass plies 14, between the carcass layer 12 and the belt structure 22, or radially inward of the innerliner 10. Depending upon the number of plies in the belt structure, and the intended use of the tire and its operating characteristics, the sealant layer 30 may also be placed between plies of the belt structure.

Figure 2:
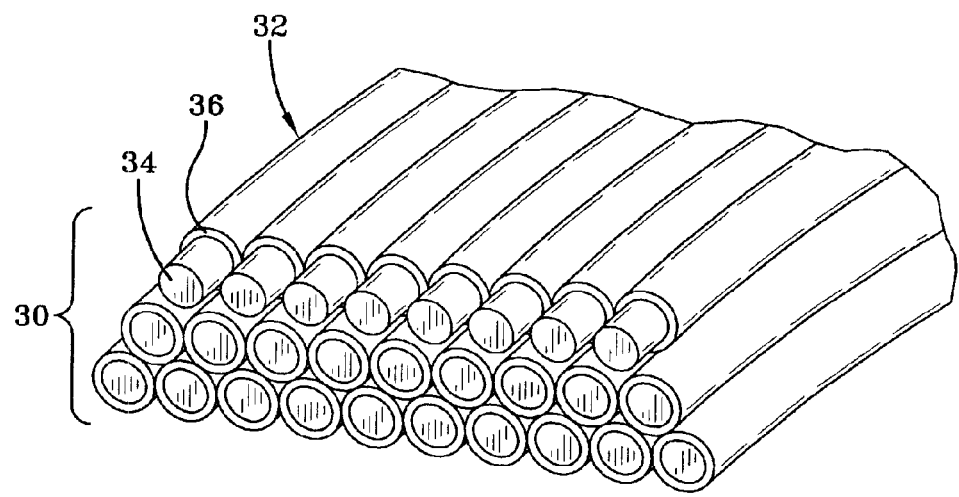
FIG. 2 is one embodiment of the sealant layer.

The sealant layer 30 is formed from a plurality of individually formed tubes 32, see FIG. 2. Each tube 32 is formed by co-extruding a sealant material 34 and a skin material 36. The sealant material 34 is selected based upon the desired properties of the sealant and the operating conditions to which the material 34 may be subjected. A suitable sealant material is, but is not limited to, that disclosed in U.S. Pat. No. 4,359,078. The skin material 36 is selected to bond readily to the adjacent plies or layers of the tire. Ideally, the skin material 36 has the same composition as one of the tire components to which the sealant layer 30 is adjacent, but may differ.

The sealant layer 30 has at least two layers of offset tubes 32. By forming at least two layers in this manner, every location along the axial width of the tire tread, and the shoulders if the sealant layer 30 extends into the shoulders, is protected by the sealant layer. Should an object pass between adjacent tubes 32 in the radially outer layer, the obstruction will pierce a tube 32 in the radially inner layer.

The largest dimension of the tubes is dependent upon the tire in which the sealant is employed. But as a general rule, for passenger and light truck tires, the tubes 32 have a maximum dimension in the range of 1.5 to 3 mm. For radial medium truck tires, the tubes 32 have a maximum dimension in the range of 2 to 4 mm.

Figure 3:
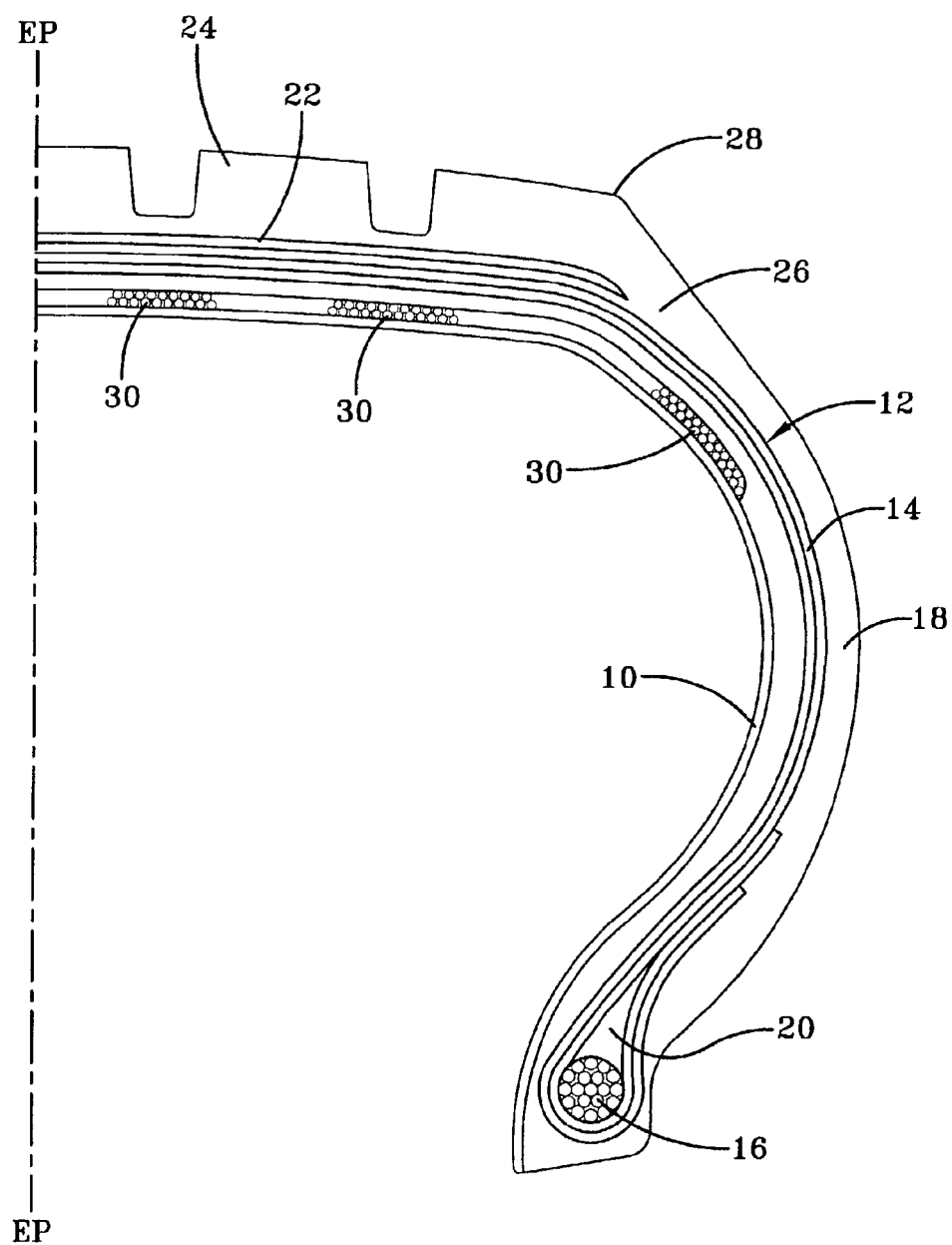
FIG. 3 is another embodiment of a tire with a sealant layer.

FIG. 1 illustrates the sealant layer 30 extending continuously from the sidewall region to the tire equatorial plane E. The sealant layer may be applied in discrete regions of the tire where the tire is most vulnerable, such as under the grooves and/or in the upper sidewall region, see FIG. 3.

Figure 4:
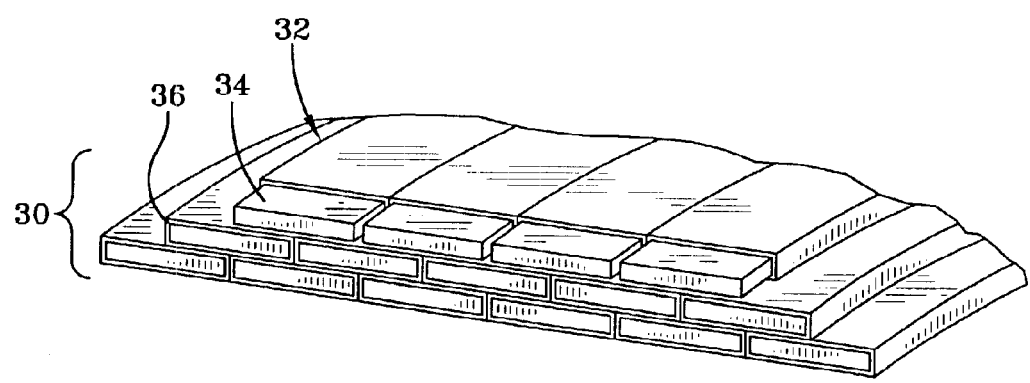
FIG. 4 is another embodiment of the sealant layer.

FIG. 4 illustrates another embodiment of the sealant tubes. The tubes have a rectangular configuration and, again, are stacked in an overlapping pattern to form a multi-layered sealant layer. Any cross-sectional configuration for the tubes 32 may be used, and is only limited by the machinery capable of extruding, or producing, the tubes 32. The cross-sectional should be one that lends itself to easy stacking to form adjacent layers. Such configurations include, but are not limited to, circular, square, rectangular, triangular, trapezoidal, parallelogram, or rhombus.

The sealant layer 30, may be formed at the time the tire is being built or pre-formed and applied to the tire building drum as a single layer, with appropriate modifications if the layer is formed non-continuously across the tire width. When formed at the time of tire building, the co-extruded sealant tubes 32 have been formed as a single continuous length of co-extruded tube in the desired cross-sectional shape. The tube is then spirally wound in a single layer and reverse spirally wound in such a manner to form multiple layers of offset tubes 32. When the sealant layer 30 is applied as a pre-formed layer, the tube can be extruded as single continuous length tube and spirally wound on a separate building drum (best when the layer 30 is to be applied as a sleeve to the tire building drum), or a wide sheet can be formed from an extruder fitted with a sufficient number of nozzles to form the desired width sheet.

Each method of forming has its advantageous. Spirally winding either on the tire building drum or a separate drum eliminates a splice from the sealant layer 30. Spiral winding on the tire drum eliminates a step in manufacturing and the need to have a supply of fixed diameter sleeves of sealant layers. Preforming as a sheet reduces build time at the tire building drum.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic tire comprising a carcass layer, an innerliner located radially inward of the carcass layer, and a sealant layer located radially outward of the innerliner, the sealant layer comprising a plurality of individual co-extruded sealant tubes wherein the sealant tubes have an outer skin and an interior of sealant material, the sealant layer being discontinuous from one tire sidewall to the opposing sidewall, wherein the tubes are located in discrete regions of the tire.

2. A tire in accordance with claim 1 wherein the sealant tubes have a circular cross-sectional configuration.

3. A tire in accordance with claim 1 wherein the sealant tubes have a rectangular cross-sectional configuration.

4. A tire in accordance with claim 1 wherein the sealant layer is formed from multiple radially adjacent layers of sealant tubes.

5. A tire in accordance with claim 4 wherein the sealant layer has three radially adjacent layers.

6. A tire in accordance with claim 1 wherein the sealant tubes are helically wound to form the sealant layer.

7. A tire in accordance with claim 1 wherein the sealant tubes are co-extruded adjacent to one another to form a sheet.

8. A tire in accordance with claim 1 wherein the outer skin has the same composition as the innerliner.

9. A tire in accordance with claim 1 wherein the outer skin has the same composition as an elastomer comprising the carcass layer.

10. A tire in accordance with claim 1 wherein the carcass layer is comprised of at least two plies and the sealant layer is located between the two radially inner most carcass plies.

11. A tire in accordance with claim 1 wherein the tire has a tread, the tread comprising at least one circumferentially extending groove, wherein the sealant layer is radially inward of the at least one groove.

12. A tire in accordance with claim 1 wherein the tire has a tread, the tread comprising at least one circumferentially extending groove, wherein the sealant layer is located only radially inward of the at least one groove.

13. A tire in accordance with claim 1 wherein the tire has a pair of opposing sidewalls and the sealant layer is located only in the upper sidewalls.

* * * * *